United States Patent [19]
Alferness

[11] Patent Number: 5,966,515
[45] Date of Patent: Oct. 12, 1999

[54] PARALLEL EMULATION SYSTEM AND METHOD

[75] Inventor: Merwin Herscher Alferness, New Brighton, Minn.

[73] Assignee: Unisys Corporation, Blue Bell, Pa.

[21] Appl. No.: 08/775,811

[22] Filed: Dec. 31, 1996

[51] Int. Cl.[6] .................................................... G06F 9/44
[52] U.S. Cl. ............................................................. 395/500
[58] Field of Search ................................ 395/500, 650, 395/184.01, 568, 800.41, 800.2

[56] References Cited

U.S. PATENT DOCUMENTS

| | | | |
|---|---|---|---|
| 4,415,969 | 11/1983 | Bayliss et al. | 395/568 |
| 5,088,058 | 2/1992 | Salsburg | 364/500 |
| 5,396,616 | 3/1995 | Venable | 395/500 |
| 5,446,876 | 8/1995 | Levine et al. | 395/184.01 |
| 5,557,795 | 9/1996 | Venable | 395/650 |
| 5,574,927 | 11/1996 | Scantlin | 395/800.41 |
| 5,615,357 | 3/1997 | Ball | 395/500 |
| 5,678,032 | 10/1997 | Woods et al. | 395/500 |
| 5,765,011 | 6/1998 | Wilkinson et al. | 395/800.2 |

*Primary Examiner*—Kevin J. Teska
*Assistant Examiner*—Dan Fiul
*Attorney, Agent, or Firm*—Charles A. Johnson; Mark T. Starr; Merchant, Gould, Smith, Edell, Welter & Schmidt

[57] ABSTRACT

A system and method for emulating a target system's hardware using highly parallel software emulation. Target system hardware under the control of program instructions is emulated using parallel software activity routines. Each of the program instructions is sequentially provided to a series of the activity routines, where each activity routine is a stage of a software emulation pipeline. Each activity routine emulates a particular function designated by the particular program instruction of the target system. The information is forwarded from each of the stages of the series of activity routines to their successive stages in the series. Each stage forwards its associated information to its respective successive stage when the stage has completed its designated activity, and has recognized that its respective successive stage has completed its respective function and is ready to accept more information.

34 Claims, 12 Drawing Sheets

SYNCHRONIZED WRITE INSTRUCTION

SYNCHRONIZED READ INSTRUCTION

PARALLEL EMULATION SYSTEM AND METHOD

BACKGROUND OF THE INVENTION

1. Field of the Invention

This invention relates generally to the emulation of computing systems, and more particularly to a high performance emulation system and method for emulating a computing system through software pipelining and synchronization.

2. Description of the Prior Art

Modern computers are able to achieve much of their high performance due to the parallel operation of the internal hardware. For example, a pipelined computer may be in the process of executing more than one instruction in each hardware cycle. With a deep pipeline, a register file update for one instruction can be performed at the same time as the arithmetic operation for the following instruction, the operand fetch for the third instruction, the address generation for a fourth instruction, the instruction decode for a fifth, and so on. Within each pipeline stage additional parallel operations can take place.

A prior art software emulation technique involves emulating instructions on a host emulation computer by executing a series of native mode instructions which emulate the instructions of the target system. The target system is the system to be emulated, and native mode instructions are instructions which can be executed by the processing environment of the host emulation computer. In such an emulation system, one native mode instruction simulates the operation of a small portion of one stage of a corresponding target system hardware operation. The result is that it may require hundreds of serially executed native mode instructions to emulate a single target system instruction which normally triggers various simultaneous hardware activities.

There is a need, therefore, for a high speed, parallel software emulation system which reduces emulation time. The present invention allows for the use of multiple activities and processors, if desired, to perform emulation in a pipelined fashion. The invention also provides an efficient synchronization mechanism for passing information from one software emulation stage to another software emulation stage. The present invention therefore provides a solution to the aforementioned emulation speed problem and other problems, and offers other advantages over the prior art.

It is a primary object of this invention to provide an improved hardware emulation system.

It is another object of the invention to enhance the speed in which an emulation system can emulate a target system.

It is yet another object of the invention to provide an improved emulation system wherein software emulates hardware functions of the target system.

It is still another object to provide software emulation routines which are executed in parallel.

Still another object of the invention is to provide software emulation routines wherein software activities are executed in a parallel, pipelined fashion, It is yet another object of the invention to forward information from one software activity to the next software activity in the software emulation pipeline, and to forward the information when a particular stage has completed its activity and when the next stage is ready to accept more information.

Other more detailed objectives will become apparent from a consideration of the Drawings and the Detailed Description of the Preferred Embodiment.

SUMMARY OF THE INVENTION

The present invention relates to a system and method for emulating a target system's hardware using highly parallel software emulation.

In accordance with one embodiment of the invention, a method for providing parallel emulation of a target system's hardware, under the control of multiple program instructions, is provided. The method includes sequentially providing the program instructions to a series of software activity routines. Each of the activity routines is a stage of the software emulation pipeline which emulates a particular function designated by the program instructions of the target system. The information is forwarded from each of the stages of the series of activity routines to their successive stages in the series. Each stage forwards its associated information to its respective successive stage when the stage has completed its designated activity, and has recognized that its respective successive stage has completed its respective function and is ready to accept more information. In one embodiment of the parallel emulation method, the information is forwarded through the series of activity routines in an asynchronous manner, whereby the information is buffered between each of the stages of the series of activity routines.

In another embodiment of the invention, an emulator is provided for use in emulating computer functions specified by program instructions of the target system. The emulator includes a memory arrangement that has multiple memory locations, where each of the memory locations includes at least one status indicator. The emulator also includes a processing arrangement that includes at least one processing unit to process multiple software activity routines. The processing arrangement is coupled to the memory arrangement to form stages of alternating activity routines and memory locations. This alternating activity routine and memory location arrangement provides for isolated emulation functions at each stage.

The processing arrangement which processes the multiple software activity routines includes at least one processing unit which is configured to emulate one of the computer functions designated by the program instructions at each activity routine. The one or more processing units also transfers the program instruction information associated with the particular target instructions being emulated from the activity routines to their associated memory locations, when the corresponding status indicators indicate that the respective memory locations are available. The "program instruction information" transferred is information resulting from the activity occurring at each activity routine stages, such as decoded information, address information, status information, and so forth. Furthermore, the one or more processing units transfer the program instruction information from the memory locations to the activity routines of successive stages, when the corresponding status indicators indicate that the respective memory locations are holding available program instruction information.

In accordance with yet another embodiment of the invention, an emulation system for emulating computer hardware under the control of a plurality of program instructions is provided. The emulation system includes a memory bank which has multiple memory locations. Each of the memory locations includes at least one status bit. The emulation system also includes processing units coupled to consecutively receive the program instructions. Each processing unit has an input to receive information from a preceding memory location, and each also has an output to provide information to succeeding memory locations.

The emulation system also includes computer program code embodied on computer-readable mediums for controlling the operation of the processing units. The computer program code at each of the processing units includes first program code to emulate a particular function designated by the program instructions. The computer program code at each of the processing units also includes second program code to forward information from each of the processing units to succeeding processing units when a given processing unit has completed its function and has recognized that its succeeding processing unit has completed its function.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
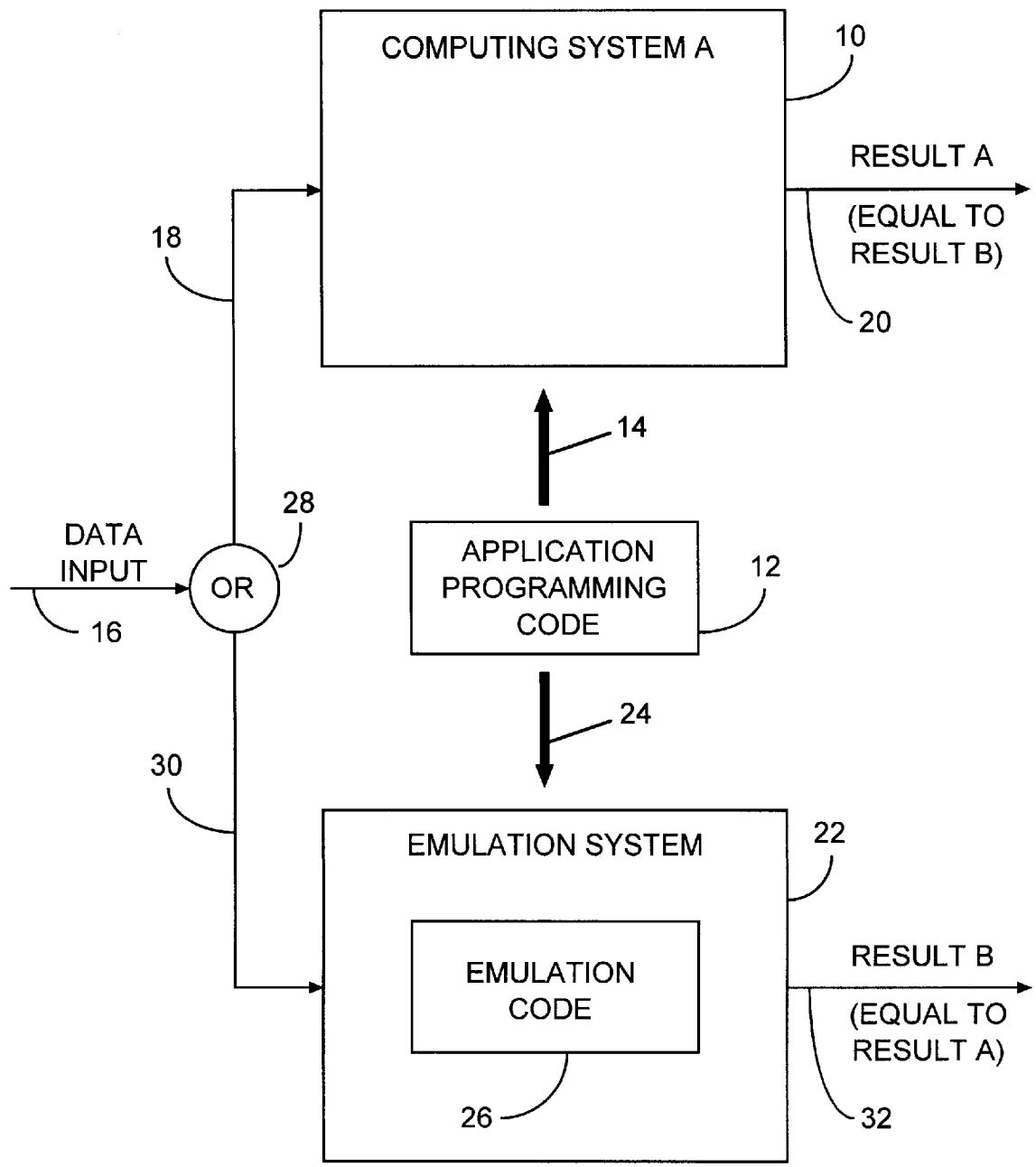
FIG. 1 is a block diagram illustrating the emulation of a computing system.

FIG. 1 is a block diagram illustrating the emulation of a computing system. Computing system A 10 is the target computing system for running the application programming code represented by block 12. As can be seen, the application programming code 12 is loaded into computing system A 10, as represented by path 14, for operation within computing system A 10. The application programming code 12 represents any type of programming code operable in the computing system A 10, including operating systems through application software packages. Data input, seen on line 16, can be directed to the computing system A 10 via line 18, and the computing system A 10 generates a result A on line 20. The particular result can include data output or the occurrence of one or more particular actions, where the result is dictated by the application programming code 12.

The emulation of computing system A 10 can be performed for various reasons, including ease in debugging the application programming code 12, minimizing reprogramming for conversion from one system to another, or to allow the application programming code 12 to be run on a different computing system. The emulation system 22 can therefore emulate computing system A 10. The emulation system 22 can receive the same application programming code 12, as represented by line 24. The emulation system 22 includes emulation code 26, which works in conjunction with the hardware of the host emulation system 22 to completely emulate the computing system A 10. The data input from line 16 can alternatively be directed to the emulation system 22 rather than the computing system A 10, as represented by the OR function block 28. The data is passed to the emulation system 22 via line 30, and using the emulation code 26 and the application programming code 12, the emulation system 22 generates a result B on line 32, which is equivalent to the result A on line 20. The equivalency of result A and result B is due to the emulation system 22 properly simulating the computing system A 10, and due to the computing system A 10 and the emulation system 22 operating on the same application programming code 12.

Figure 2:
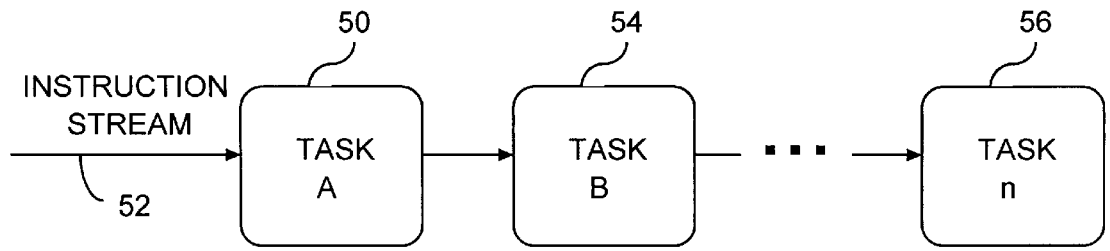
FIG. 2 illustrates the execution of multiple functions within an instruction to be emulated.

FIG. 2 illustrates a solution for executing multiple functions within an instruction to be emulated. An instruction, which is a subset of the application programming code 12, may trigger various hardware functions within computing system A 10. In order to emulate instructions via software emulation, these various functions designated by the instruction are typically executed in a serial manner by executing a series of native mode instructions on the open "host" or emulation computing system.

Referring to FIG. 2, the instruction enters task A 50 as shown by the instruction bus 52. A portion of this instruction, or function, can be performed at task A 50, and another portion of the instruction can be performed at task B 54, and additional functions designated by the instruction are performed by various tasks through task n 56. Where these tasks are performed via software, the system under which the software emulation is controlled must execute each of the tasks represented by task A 50 through task n 56 before another instruction on instruction bus 52 can be emulated.

Figure 3:
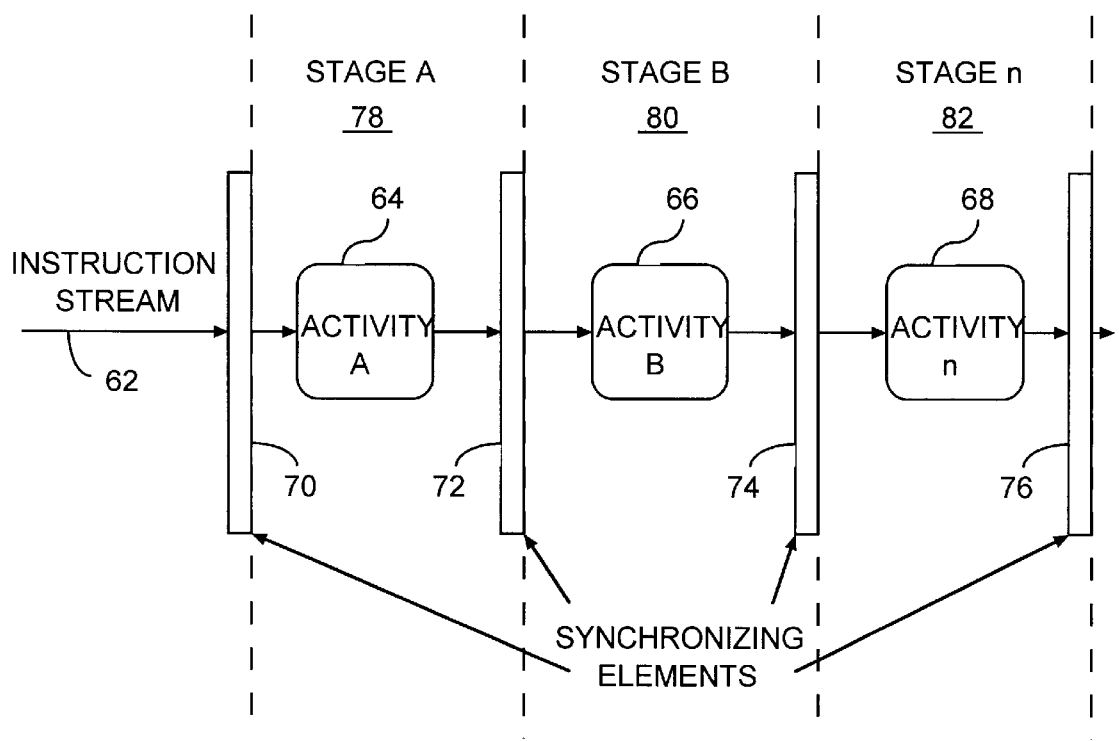
FIG. 3 illustrates one manner of emulating the instructions in a parallel manner in accordance with the present invention.

FIG. 3 illustrates one manner of emulating the instructions in a parallel manner according to the present invention. A continuous instruction stream on instruction bus 62 can be executed in parallel through the use of multiple activities and separating synchronizing elements. Each of the functions in the instruction are executed by a different activity, shown as activity A 64, activity B 66, through activity n 68. However, the synchronizing elements 70, 72, 74 and 76, provide a storage buffer for the instruction as it passes through. For example, an instruction on instruction bus 62 which is buffered in synchronizing element 70 and executed by activity A 64 does not immediately proceed to activity B 66. Rather, the instruction is passed to synchronizing element 72 upon completion of the particular function by activity A 64. The buffered instruction in synchronizing element 72 is then passed to activity B 66 in an orderly fashion, and the instruction continually progresses in a similar fashion through activity n 68 where it is finally buffered by synchronizing element 76.

The synchronizing elements 70, 72, 74 and 76 allow instructions to continually enter the emulation system as soon as the first function executed by activity A 64 has been completed. This allows a different instruction to exist at each stage of the emulation pipeline. For the example of FIG. 3, the emulation pipeline is shown as an n-stage emulation pipeline including stage A 78, stage B 80, through stage n 82. Each instruction entered on instruction bus 62 passes through the emulation pipeline where a different function of each particular instruction is executed at each stage of the emulation pipeline. Therefore, a number of instructions to be emulated from the instruction stream can be executed in parallel, the number of instructions executed in parallel being commensurate with the number of activities in the emulation pipeline.

Figure 4:
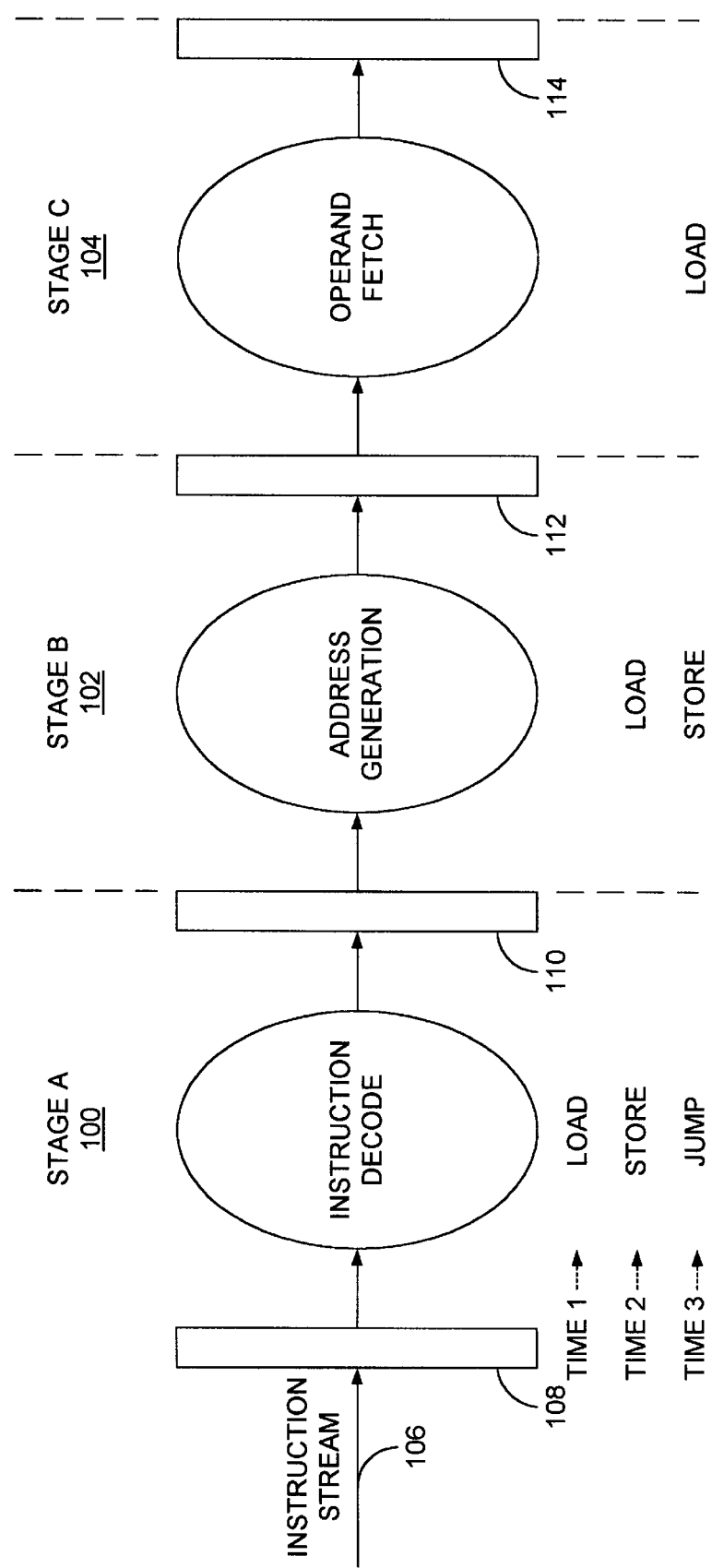
FIG. 4 is a diagram illustrating one example of an emulation pipeline according to the present invention where three pipeline stages of a multiple-stage pipeline are shown.

FIG. 4 is a diagram illustrating a portion of a multiple-stage emulation pipeline. The portion of the emulation pipeline illustrated in FIG. 4 includes three pipeline stages. The pipeline stages include stage A 100, wherein an instruction decode function is performed. At stage B 102, an address generation function is performed, and at stage C 104 an operand fetch function is performed. In this example, the instruction stream on bus 106 enters register 108 where it is provided to the instruction decode activity which performs an instruction decode function at stage A 100. When the instruction decode function is completed, the instruction passes to stage B 102 by way of register 110, and a second instruction can then be decoded at stage A 100 because the register 110 buffers stage A 100 from stage B 102. Similarly, the first instruction in the instruction stream continues to stage C 104, which is buffered from stage B 102 by register 112. A final register 114 can optionally be provided to buffer stage C 104 from external circuitry.

The emulation pipeline as shown in FIG. 4 therefore allows three instructions from the instruction bus 106 to be executed in parallel. A portion of each of the instructions is executed at each of the activities within the stages of the pipeline. A separate activity is performed at each stage of the pipeline to emulate a particular one of the logical functions requested by the particular instruction. Each activity receives its input from the previous stage of the pipeline, performs the required logical function, and presents its output to one or more activities for the next stage of the pipeline.

As an example, a first instruction in the instruction stream on instruction bus 106 could be a LOAD instruction, followed by a STORE instruction, further followed by a JUMP instruction. At Time 1, the LOAD instruction is decoded at stage A 100. When the instruction decode is completed, the decoder instruction is forwarded to register 110, which buffers the instruction decode activity from the address generation activity. At Time 2, the LOAD instruction is forwarded from the register 110 to address generation activity at stage B 102. During the address generation function, a subsequent instruction can be decoded by the instruction decode activity at stage A 100. This subsequent instruction is the STORE instruction which is then decoded while the LOAD instruction resides at stage B 102. When each of the functions have been performed at stages A 100 and B 102, the resulting information is passed to the respective registers 110 and 112.

When the LOAD and STORE instructions have been passed to registers 110 and 112 respectively, yet another instruction from the instruction stream can be decoded at stage A 100. While this instruction decode occurs, the STORE instruction and LOAD instruction can be simultaneously executed by the address generation activity and the operand fetch activity at stages B 102 and C 104 respectively. Therefore, at Time 3 a function of the JUMP, STORE, and LOAD instructions are executed in parallel in the emulation pipeline.

Figure 5:
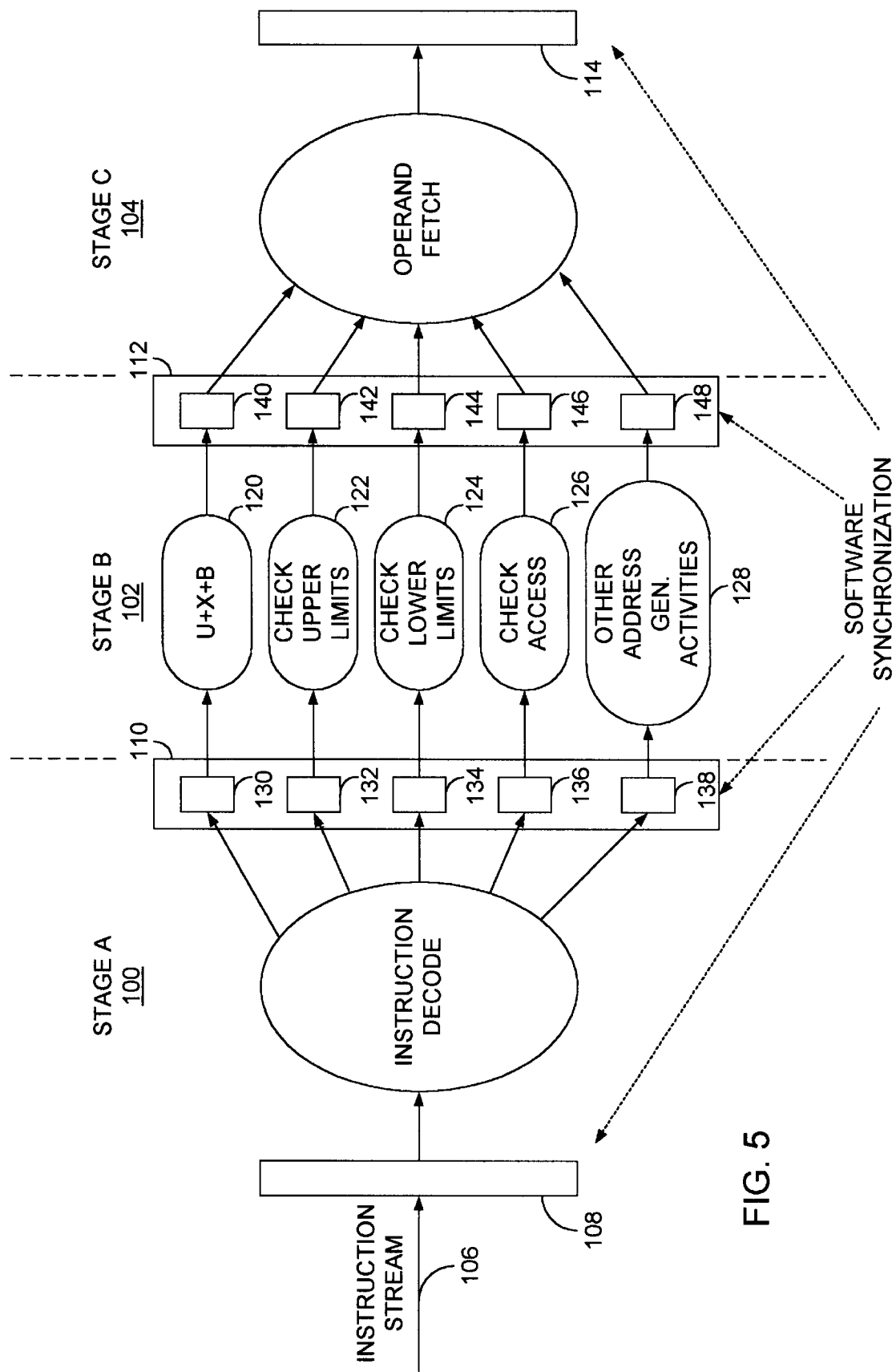
FIG. 5 illustrates an emulation pipeline according to the present invention wherein various sub-functions of a particular function are executed in parallel within a stage of the emulation pipeline.

FIG. 5 illustrates an emulation pipeline wherein various sub-functions of a particular function are executed in parallel within a stage of the emulation pipeline. In the example of FIG. 5, an instruction stream 106 is provided to an emulation pipeline including stages A 100, B 102, and C 104, and registers 108, 110, 112, and 114, as was illustrated in FIG. 4. FIG. 5, however, illustrates how a function such as the address generation function of FIG. 4 can be divided into a number of sub-functions which are executed in parallel. The address generation function at stage B 102 of FIG. 5 is divided into sub-activities 120, 122, 124, 126 and 128. Each of these sub-activities is executed by the emulation software in a parallel manner, requiring multiple software emulation routines to be simultaneously performed. This can be accomplished through the use of various multi-tasking techniques, including the use of multiple processing devices and multi-tasking processing devices. In the example of FIG. 5, sub-activity 120 performs a portion of the address generation activity including adding an instruction address to an index register and a base register. Sub-activities 122 and 124 respectively check the upper and lower limits of available address space, which sub-activities 126 and 128 perform access checks and other address generation activities.

Because stage B 102 of FIG. 5 performs various sub-activities in parallel, the synchronizing elements bordering stage B 102 must also be divided to correspond to each of the sub-activities performed. For example, the software synchronization elements represented by registers 110 and 112 are each divided into multiple registers corresponding to their respective sub-activities. Register 110 is divided into at least five individual synchronizing elements labeled registers 130, 132, 134, 136 and 138. Register 112 is similarly divided into at least five synchronizing elements labeled register 140, 142, 144, 146 and 148. Therefore, when the instruction has been decoded at stage A 100, each of the registers associated with register 110 provides a buffer between the sub-activities of stage B 102 and the instruction decode activity of stage A 100. In a similar manner, each of the sub-activities in stage B 102 store its resulting information in the registers associated with register 112, which buffers the sub-activities in stage B 102 from the operand fetch activity in stage C 104. However, in order to properly move information through the software emulation pipeline, the synchronizing elements must receive and retransmit the information from one stage to another in an orderly fashion, as will be described in more detail below.

Figure 6:
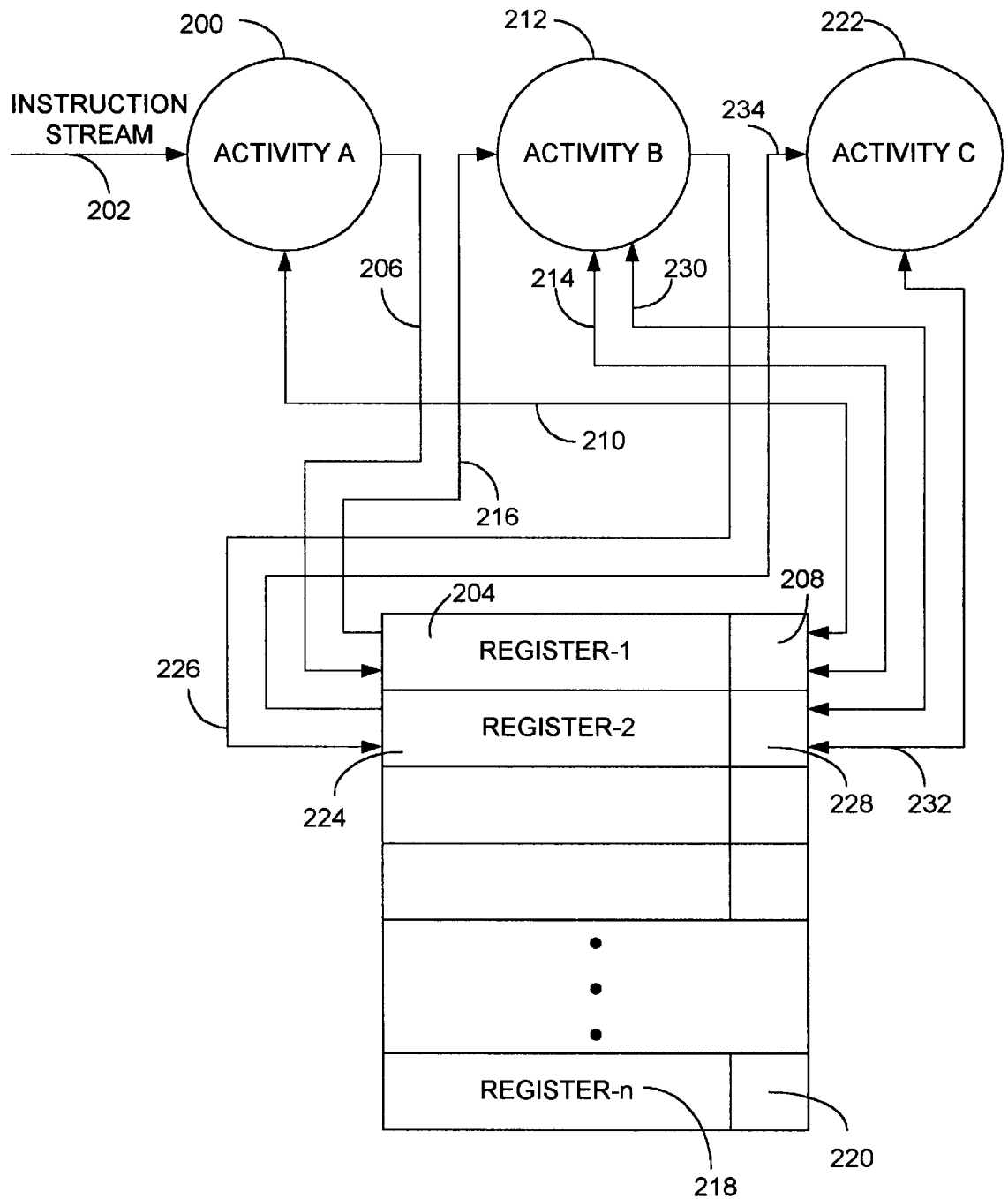
FIG. 6 is a block diagram of one embodiment of the emulation pipeline and synchronization elements in accordance with the present invention.

FIG. 6 is a block diagram of one embodiment of the emulation pipeline and synchronization elements in accordance with the present invention. A first instruction enters activity A 200 via the instruction stream on instruction bus 202. Activity A 200 performs a particular function, such as an instruction decode function. The results of executing this function are transferred to a synchronizing element, labeled register-1 204 via bus 206. Register-1 204 can be loaded in a variety of ways, i.e., serially or in parallel, although in a preferred embodiment the registers are loaded in parallel.

Before activity A 200 can load information into register-1 204, it must insure that register-1 204 is empty and therefore ready to accept data. In order for activity A 200 to determine whether register-1 204 is empty, a status flag associated with register-1 204 is checked. This status flag 208 can be represented in various ways, and in one embodiment is represented by a single binary bit. Furthermore, the status flag 208 can be monitored by a separate software routine, or by activity A 200 itself. Where the bit in the status flag 208 indicates that register-1 204 is empty and ready to accept data, a function completed by activity A 200 can generate information to be stored in register-1 204 via bus 206. When register-1 204 has been loaded, the bit in the status flag 208 is changed to indicate that it is no longer empty, and is storing information that will ultimately be provided to a subsequent emulation activity.

Activity A 200 monitors the status flag 208, and also sets the status bit to an open "full" state, as represented by connection 210. Activity B 212 also monitors the state of the status flag 208 to determine when it can receive the contents of register-1 204. Activity B 212 monitors the status flag 208 as shown by connection 214. When activity B 212 recognizes that the status flag 208 indicates that register-1 204 is full, activity B 212 reads the data stored in register-1 204 via bus 216. In order to allow register-1 204 to again be filled by data on bus 206 from activity A 200, activity B 212 clears the status bit in status flag 208 by way of a signal also represented by connection 214. As can be seen, the status flag 208 allows register-1 204 to be a timed buffer between activity A 200 and activity B 212. This timing function synchronizes the transfer of information from activity A 200 to activity B 212, although the use of the status flag 208 is somewhat asynchronous in that each activity monitors for an event before taking a particular action.

The larger the emulation pipeline, the larger the register bank that will be required. The register bank shown in FIG. 6 is shown having an indefinite number of individual registers, represented by register-n 218. Each register includes a status flag, and the status flag associated with register-n 218 is status flag 220. The register bank depicted in FIG. 6 is representative only, as each register can be of various forms, including a chain of latching devices such as flip flops, or contiguous locations in a memory.

As instructions progress through the emulation pipeline from activity B 212 to activity C 222, another synchronizing element will be required. Register-2 224 represents the register between these emulation activities. Before activity B writes its resulting information to register-2 224 via bus 226, activity B 212 monitors the status bit in status flag 228 as shown by connection to 30. When activity B 212 has completed its corresponding function, activity B 212 will provide the resulting data to register-2 224 when the status bit indicates that register-2 224 is empty and ready to accept data. When activity B 212 has written to register-2 224, it sets the status of the status flag 228 to indicate that register-2 224 is now full and ready to provide data to subsequent activities in the emulation pipeline.

Activity C 222 monitors the status flag 228 of register-2 224 as shown by connection 232. When activity C 222 is ready to accept information from register-2 224, and activity C 222 recognizes from the status flag 228 that register-2 224 is full, activity C 222 accepts the data from register-2 224 via bus 234. Therefore, the use of the registers and the status flags allow an instruction stream on instruction bus 202 to progress through the emulation pipeline.

Figure 7:
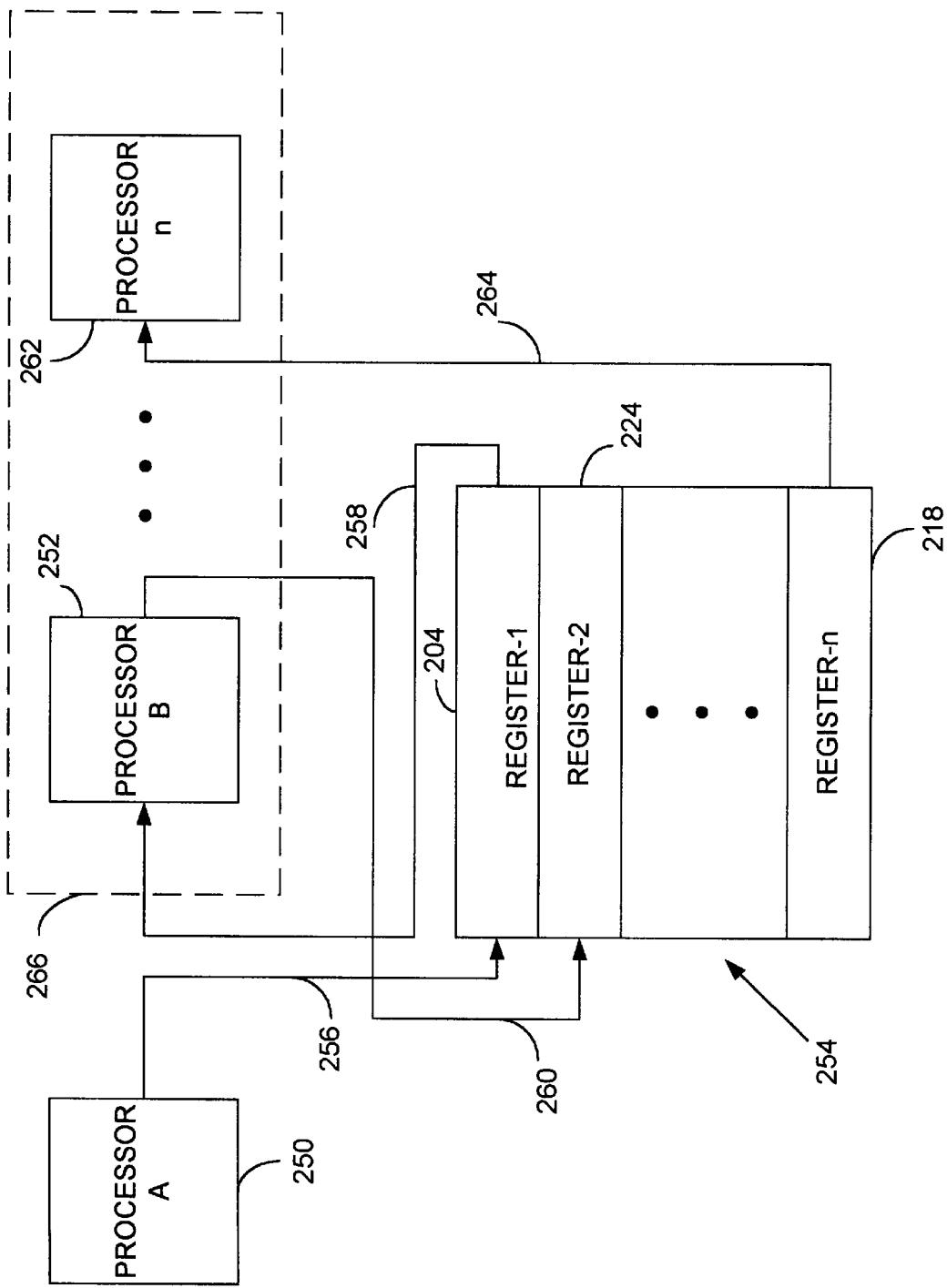
FIG. 7 is a block diagram illustrating one embodiment of the emulation hardware used in connection with the present invention.

FIG. 7 is a block diagram illustrating one embodiment of the emulation hardware used in connection with the present invention. FIG. 6 illustrated the use of activity routines, such as Activity A 200, Activity B 212 and Activity C 222. These activity routines may include software programs operating under the control of a computing device.

Processor A 250 is a computing device capable of operating under the control of a computer program, such as the activity routine labeled in FIG. 6 as Activity A. Similarly, processor B 252 is a computing device capable of operating under the control of the activity routine labeled as Activity B in FIG. 6. Activity A, operating in connection with processor A 250, performs the emulation function designated, and is buffered from other activity routines by a register in the register bank 254. Processor A 250, when ready to transfer its information, performs this transfer by loading the information into register-1 204, which was also shown in FIG. 6, via a bus represented by line 256. When activity B, working in connection with processor B 252, is ready to receive the information, it receives it from register-1 204 via the bus represented by line 258.

In a similar manner, activity B, operating in connection with processor B 252, performs the emulation function designated, and is buffered from other activity routines by another register in the register bank 254. Processor B 252, when ready to transfer its information, performs this transfer by loading the information into register-2 224, which was also shown in FIG. 6, via a bus represented by line 260. Other subsequent activities receive the information through the emulation pipeline from corresponding, subsequent registers from the register bank 254. This occurs through the end of the emulation pipeline, represented by processor n 262, which receives its information from register-n 218 of register bank 254 via the bus represented by line 264.

In another embodiment, separate processing units are not required, as multi-tasking processors may be used instead of some, or all, of the individual processors. For example, processor B 252 through processor n 262 can be replaced by a multi-tasking processing system, capable of carrying out multiple activity routines concurrently, represented by the multi-tasking processing block 266.

Figure 8:
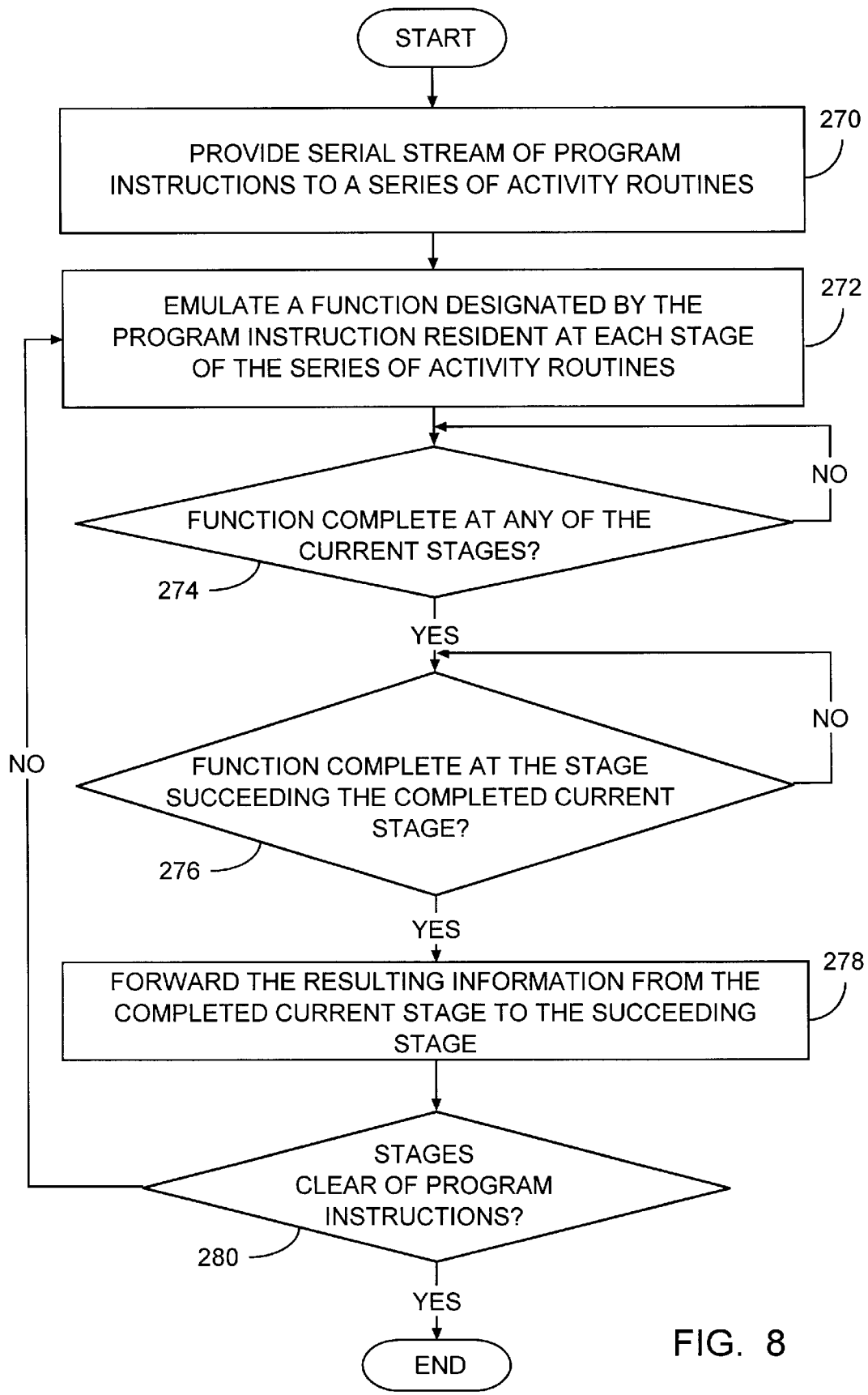
FIG. 8 is a general flow diagram illustrating one aspect of the invention.

FIG. 8 is a general flow diagram illustrating one aspect of the invention. Processing begins at step 270, where a serial stream of program instructions is provided to a series of activity routines. Each activity routine in the series of activity routines is isolated from other activity routines by the registers. At step 272, functions designated by the program instructions are emulated at each stage of the series of activity routines. Emulation of hardware by way of software programs is generally known, where software instructions executed on a host emulation computer emulate the hardware that would normally respond to the program instruction to be emulated. The emulation of a hardware function by a corresponding software emulation program is known in the art, and need not be described in further detail.

Decision step 274 determines whether a function has been completed at any of the current stages of the emulation pipeline. Where no functions have been completed, processing is returned to decision step 274 until a function has been completed. When a function has been completed, decision step 276 determines whether the stage subsequent to the completed current stage in the emulation pipeline has completed its function. An indication of the completion of each function must be given, as the current stage will not send information until its associated function is complete, and the subsequent stage will not accept the information until it is prepared to receive new information, which occurs when it has sent its associated data off to its subsequent emulation pipeline stage.

Therefore, where a function has been completed at a current stage and a stage succeeding that stage, processing moves from decision steps 274 and 276 to step 278, where the particular information resulting from the emulated function is forwarded from the completed current stage to the succeeding stage. This transfer of information, occurring when each contiguous pair of emulation pipeline stages indicates its availability for allowing the transfer, continually moves down the emulation pipeline until the functions designated by the program instruction have been accomplished.

It should be understood that while decision step 276 determines whether a function is completed at the stage succeeding the completed current stage, the operation depicted by decision step 274 will continue to determine whether any of the current stages have been completed. In other words, these operations may occur concurrently. The process illustrated in FIG. 8 is therefore continued until all emulation stages are clear of program instruction information, and no additional program instructions are entering the emulation pipeline, as shown in decision step 280. Program instruction "information" is the information resulting from performing the activity at each activity routine stage, such as decoded information, address information, status information, and so forth. Where no program instruction information is being processed by the emulation pipeline, processing ends. Where program instruction information is still being processed in the pipeline, processing returns to step 272, where pipeline stages that received new information emulate the function designated by the information at that pipeline stage. The information at the pipeline stages is a resultant of the direction originally provided by the program instructions provided at step 270.

Figure 9:
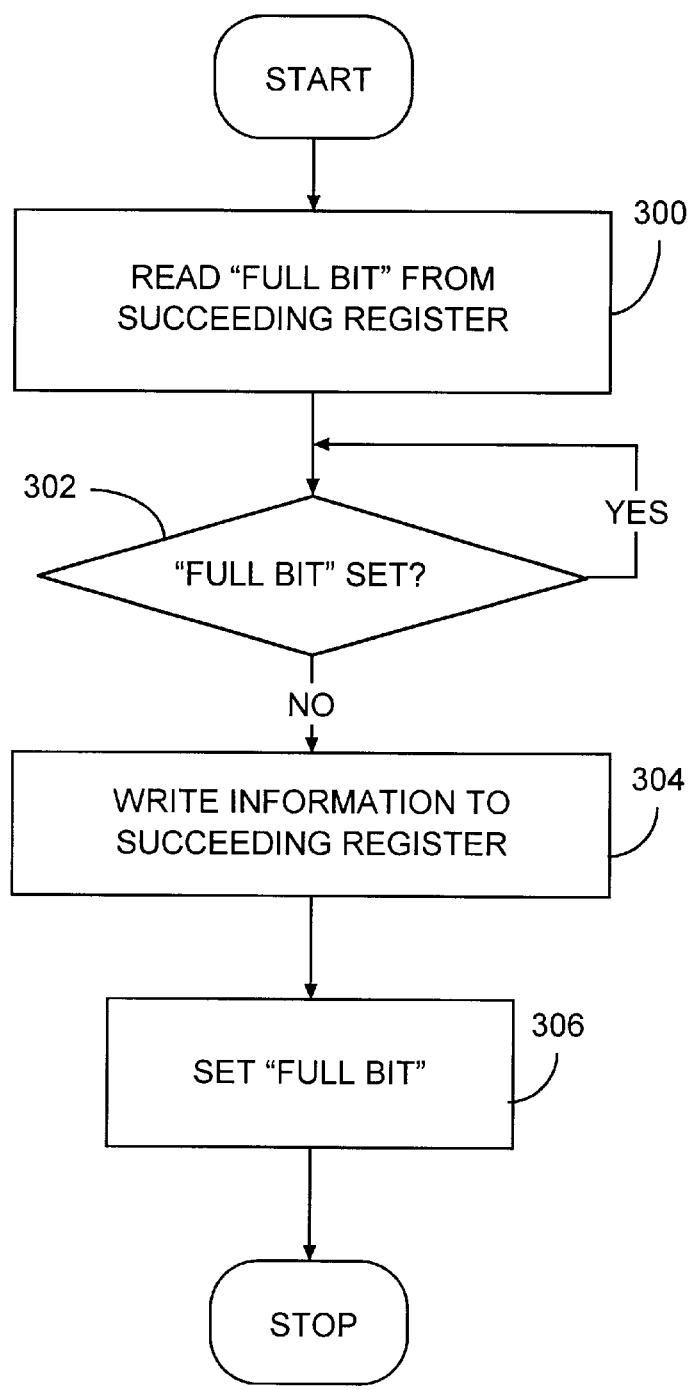
FIG. 9 is a flow diagram illustrating one manner in which a current emulation pipeline stage transfers information to a subsequent emulation pipeline stage.

FIG. 9 is a flow diagram illustrating one manner in which a current emulation pipeline stage transfers information to a subsequent emulation pipeline stage. FIG. 9 represents the flow of a "synchronized write instruction", which allows information to be passed from one activity routine to another activity routine in a systematic and organized manner. The synchronized write instruction ensures that the sending activity routine is stalled until the receiving activity is ready to accept the information.

Processing begins at step 300, where a status bit, referred to as the "full bit", is read from the register logically positioned subsequent to the current stage in the emulation pipeline. This status read occurs after the current stage's activity routine has completed its requested function. Monitoring the full bit allows the current stage to determine when the register is empty and prepared to accept information destined for the succeeding stage. When the succeeding stage has taken information from that register, it clears the full bit to indicate to the previous stage that it can now write its information to the register. It is this register state that the synchronized write instruction monitors for at decision step 302. At decision step 302, the "full bit" register location is monitored, and if the contents of the full bit register location indicates a first predetermined logic state (a logic high in the example of FIG. 9), processing is stalled by returning processing to itself until the full bit is recognized to be at a second predetermined logic state (a logic low in the example of FIG. 9). When the full bit is not set, it indicates that the register positioned between the current stage and the succeeding stage is ready to accept information.

When it is detected that the full bit is not set, processing continues at step 304, where the digital information is written to the register succeeding the current stage and preceding the subsequent stage in the emulation pipeline. Along with sending this information to ultimately be processed by the activity routine in the subsequent stage, the "full bit" is changed to reflect that the register is now loaded with new digital information, as shown at step 306. The state of the full bit will be monitored by the activity routine in subsequent stages of the emulation pipeline, as will be described in connection with FIG. 10.

Figure 10:
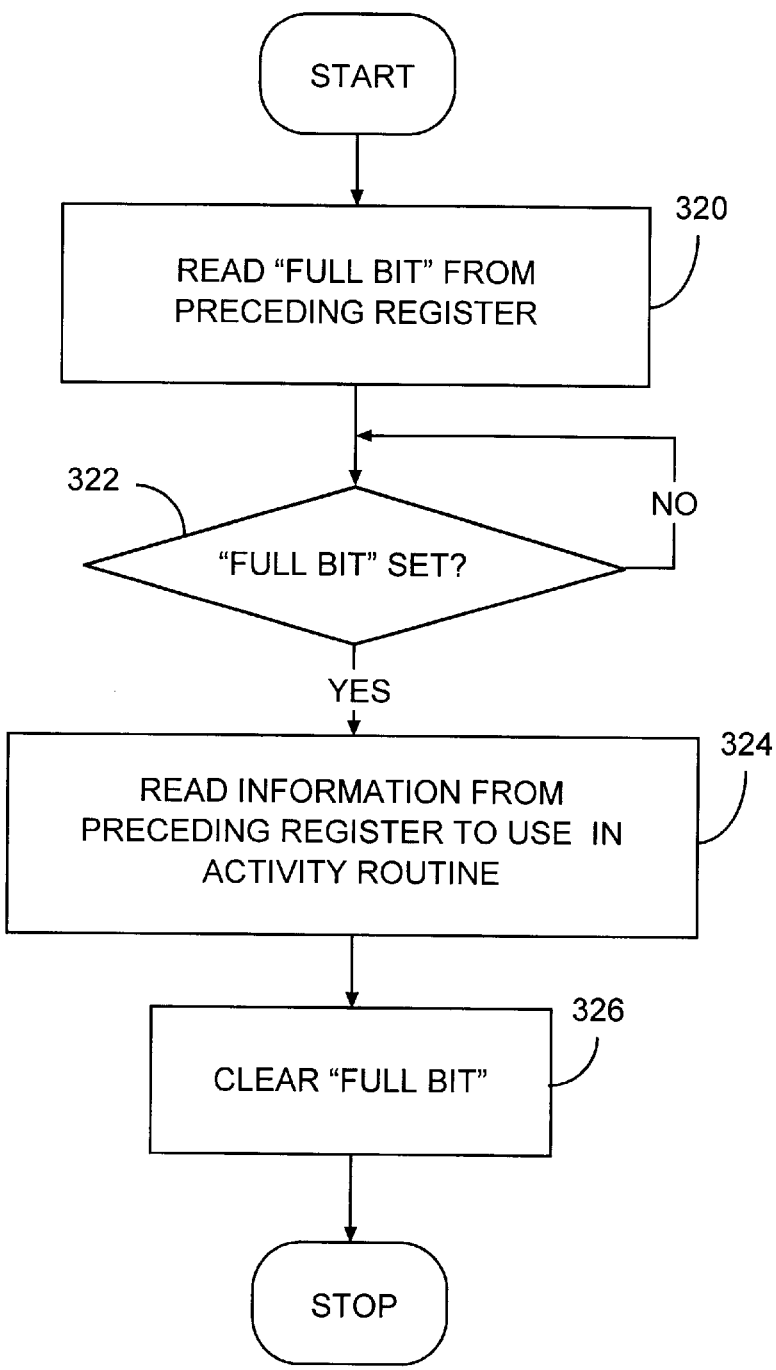
FIG. 10 is a flow diagram illustrating one manner in which an emulation pipeline stage receives information from a previous emulation pipeline stage.

FIG. 10 is a flow diagram illustrating one manner in which an emulation pipeline stage receives information from a previous emulation pipeline stage. FIG. 10 represents the flow of a "synchronized read instruction", which allows information to be systematically received by one activity routine from another activity routine. The synchronized read instruction ensures that the receiving activity routine is stalled until the sending activity has made information available to be received.

Processing begins at step 320, where the status bit, referred to as the "full bit", is read from the register positioned previous to the stage in the emulation pipeline preparing to receive information. This status read occurs after the activity routine at that stage has completed its most recently requested function. Monitoring the full bit allows the activity routine at this stage to determine when the register has been loaded with information from the preceding emulation pipeline stage. When the preceding stage has loaded the information to that register, it sets the full bit to indicate to the succeeding stage that it can now take the information from the register.

At decision step 322, the "full bit" register location is monitored, and if the contents of the full bit register location indicates a first predetermined logic state (a logic low in the example of FIG. 10), processing is stalled by returning processing to itself until the full bit is recognized to be at a second predetermined logic state (a logic high in the example of FIG. 10). Therefore, when the full bit is set, it indicates that the register positioned between the sending stage and the receiving stage has received information to be transferred to the receiving stage.

When it is detected that the full bit is set, processing continues at step 324, where the digital information is read from the register preceding the current receiving stage. When the information is read from this register, the full bit is cleared, as shown in step 326, in order to make the register available for new information to be written to it by way of a synchronized write instruction, as described in connection with FIG. 9.

Figure 11:
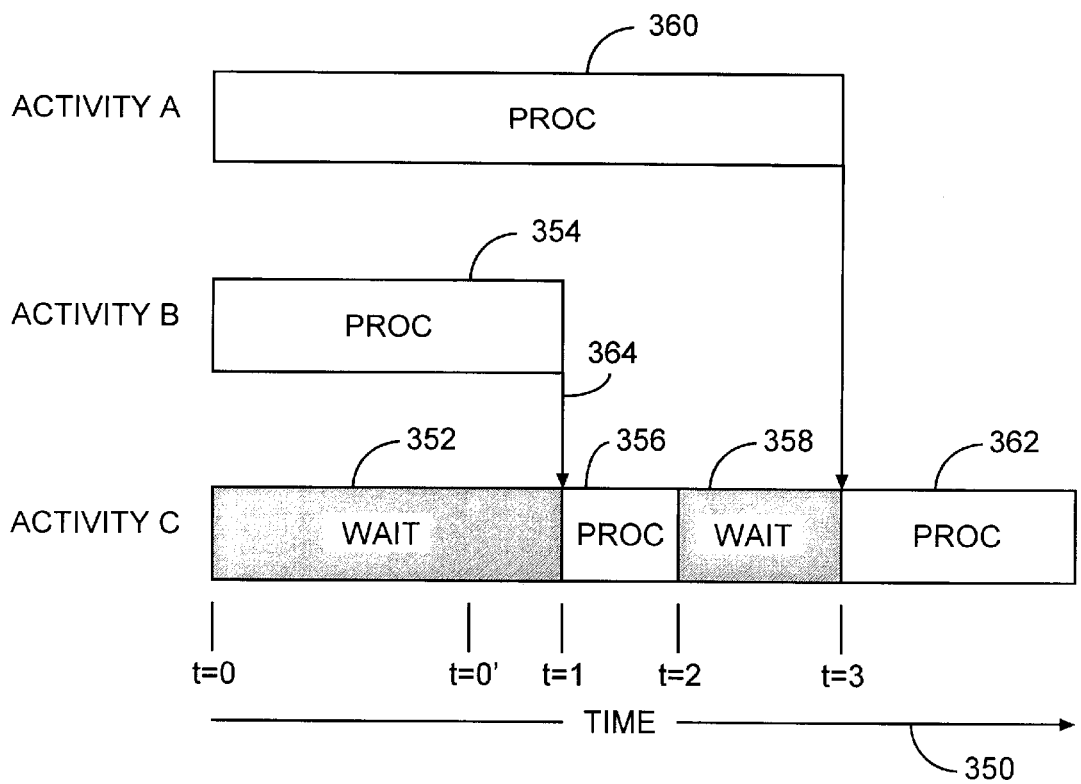
FIG. 11 is a timing diagram illustrating the timing relationship between three stages of an emulation pipeline.

Referring now to FIG. 11, a timing diagram illustrating the timing relationship between three stages of an emulation pipeline is provided. Three activity routines which are part of three different emulation pipeline stages are shown as activity A, activity B and activity C. Each of the activities are associated with certain activity "time blocks". The relationship between time blocks of each of the activity routines is shown relative to time, shown by the time arrow 350.

For the example of FIG. 11, activity C is subsequent to Activities A and B in the emulation pipeline. Although the previous examples referred to emulation pipeline stages which required information from a single preceding pipeline stage, the example of FIG. 11 shows activity C requiring input from two preceding activity routines.

Activity C is shown having a first time block 352 where processing is stalled so that activity C is in a "wait" state. Such may be the case where activity C has completed a function, and is monitoring the state of the "full bit" as shown in step 322 of FIG. 10. During this time, the activity C routine "waits" until the "full bit" is set, which indicates that new information is available in the register at the input of activity C. Activity C is in the "wait" state illustrated by time block 352 between times t=0 and t=1.

While activity C waits for available input, activity B, which is the emulation pipeline stage immediately preceding the pipeline stage associated with activity C, performs its designated function, as illustrated by processing time block 354. At time t=1, activity B stops processing, writes its information to its successive register, and sets the "full bit" to indicate that information is available in the register. Activity C then recognizes that the full bit is set, accepts the information from the register, and begins processing, as shown by time block 356 between times t=1 and t=2. When activity C has completed its designated function at time t=2, it again enters a wait state depicted by time block 358, where it again waits for available input.

During the wait and processing times depicted by time blocks 352, 356 and 358, activity A performs its function as designated by the program instruction, as illustrated by processing time block 360. When processing has completed at activity A, activity A executes a synchronized write instruction to load a register which buffers activity A from activity C. Activity C responds with a synchronized read instruction, which recognizes the register has been loaded, accepts the information, and clears the full bit to allow the register to subsequently accept new information. When activity C receives the information at time t=3, activity C can again perform its function on the information provided by activity A, as shown by processing time block 362. The information provided by activity A and activity B from processing time blocks 354 and 360 are therefore inputs to activity C, as shown by input lines 364 and 366.

Various levels of parallel processing can occur in the example of FIG. 11. Wait time block 352 is shown as a wait state, however much of the time between time t=0 and t=1 can actually be processing time. For instance, activity C can be performing its function on information already within activity C between times t=0 and t=0' from the previous instruction in the emulation pipeline. Because Activities B and C are separated by a buffering register, each can simultaneously perform its associated function on different information, and then pass the information down the emulation pipeline. Therefore, emulation can be performed in parallel between times t=0 and t=0' for Activities A, B and C. Furthermore, Activities A and C operate in parallel between times t=1 and t=2.

Figure 12:
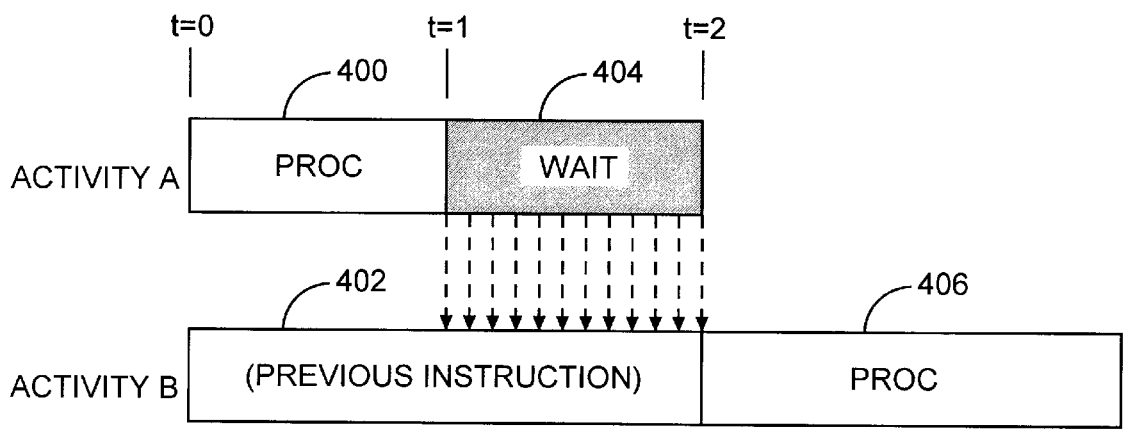
FIG. 12 is a timing diagram illustrating another timing relationship between two stages of an emulation pipeline.

FIG. 12 is a timing diagram illustrating another timing relationship between two stages of an emulation pipeline. While FIG. 11 illustrated an example where an activity routine (activity C) was stalled until its input information was available, FIG. 12 illustrates an example of an activity routine (activity B) which is not ready to accept the information by the time the sending activity routine (activity A) is able to output the information. In other words, the example of FIG. 12 illustrates where a synchronized write request monitors the full bit, stalls activity A until the register is empty, loads the information into the register, and sets the full bit.

Activity A is shown in FIG. 12 as having two time blocks. Processing time block 400 represents the time in which activity A performs its function on an instruction in the emulation pipeline. During the time between time t=0 and t=1, activity B is performing its function on a previous instruction in the emulation pipeline, represented by processing time block 402. When activity A completes its function at time t=1, activity A enters a wait state represented by wait time block 404. Activity A will not perform another function on a subsequent program instruction until activity A can load the register between activity A and activity B. Therefore, activity A "waits" between time t=1 and t=2 until it recognizes that activity B has cleared the full bit of the register, indicating that activity A can load the information into the register. At time t=2, activity A recognizes that its information can be transferred to the intermediate register, and activity B can receive the information and begin processing as shown by processing time block 406.

Figure 13:
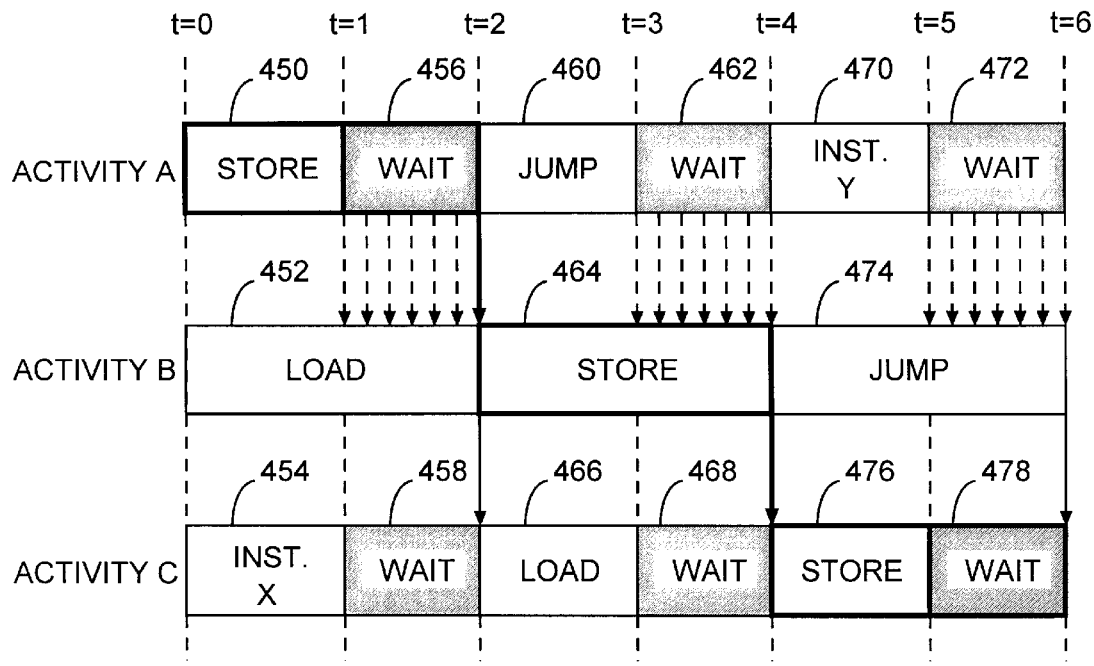
FIG. 13 is a timing diagram of the timing relationships of the stages of an emulated pipeline as it processes multiple program instructions in parallel.

FIG. 13 is a timing diagram of the timing relationships of the stages of an emulated pipeline as it processes multiple program instructions in parallel. In the present example, the program instructions STORE, LOAD, and JUMP are shown as they are processed in parallel, as is a representation of a preceding instruction labeled INST. X and a succeeding instruction labeled INST. Y.

The function performed by activity A is analogous to the situation described in connection with FIG. 12, where the function is complete prior to the receiving activity being able to accept the resulting information. In other words, the output of activity A is ready before activity B is ready to accept it. The function performed by activity C is analogous to the situation described in connection with FIG. 11, where activity C enters wait states until the preceding activity routines (e.g., activity B) can provide input.

The STORE instruction is in the emulation pipeline at the pipeline stage associated with activity A at a particular instance of time represented by time t=0. Also at time t=0, the LOAD instruction is in the emulation pipeline at the pipeline stage associated with activity B, and an instruction labeled INST. X is in the emulation pipeline at the pipeline stage associated with activity C. INST. X represents the instruction immediately preceding the LOAD instruction. The STORE instruction between times t=0 and t=1 at activity A is the store time block 450. The LOAD instruction between times t=0 and t=2 at activity B is the load time block 452, and the INST. X instruction between times t=0 and t=1 at activity C is the time block 454 necessary to perform the function designated by INST. X. The STORE, LOAD, and INST. X instructions are executed in parallel, as seen between times t=0 and t=1.

At time t=1, activity A enters a wait state as seen by wait time block 456, which is maintained until the LOAD instruction at time block 452 from activity B has completed its emulated function at time t=2. Also at time t=1, INST. X at time block 454 enters a wait state as seen by wait time block 458, which is maintained until the LOAD instruction at activity B has completed at time t=2.

A similar scenario exists between times t=2 and t=4. A JUMP instruction at time block 460 is followed by a wait time block 462, while the STORE instruction has moved down the emulation pipeline to the stage associated with activity B shown in the time block 464. This STORE instruction is the result of the STORE instruction from time block 450 being passed down the emulation pipeline to the next activity routine. The LOAD instruction similarly is passed from the time block 452 in activity B to the time block 466 in activity C. Activity C enters a wait state shown by wait time block 468 when the function associated with the LOAD instruction is complete at time t=3.

Yet another similar scenario exists between times t=4 and t=6. Another subsequent instruction, labeled INST. Y at time block 470 is followed by a wait time block 472, while the JUMP instruction has moved down the emulation pipeline to the stage associated with activity B shown in the time block 474. INST. Y represents the instruction immediately subsequent to the JUMP instruction. This JUMP instruction is the result of the JUMP instruction from time block 460 being passed down the emulation pipeline to the next activity routine. The STORE instruction similarly is passed from the time block 464 in activity B to the time block 476 in activity C. Activity C enters a wait state shown by wait time block 478 when the function associated with the STORE instruction is completed at time t=5.

FIG. 13 illustrates the progression of a particular instruction through the emulation pipeline. For example, the STORE instruction moves from time block 450 at activity A, to time block 464 at activity B, to time block 476 at activity C. FIG. 13 also illustrates how the emulated functions are executed in parallel. Furthermore, FIG. 13 shows that the performance, or speed, of the emulated pipeline is limited by the slowest pipeline stage. For example, processing speed in the example of FIG. 13 is limited by the speed of function execution at activity B, which is evident by the wait states occurring in Activities A and C.

In order to further increase the parallel emulation speed in the emulation pipeline, one or more activities are duplicated to provide multiple subactivities within a particular activity. This is best described by way of example illustrating this aspect of the invention.

Figure 14:
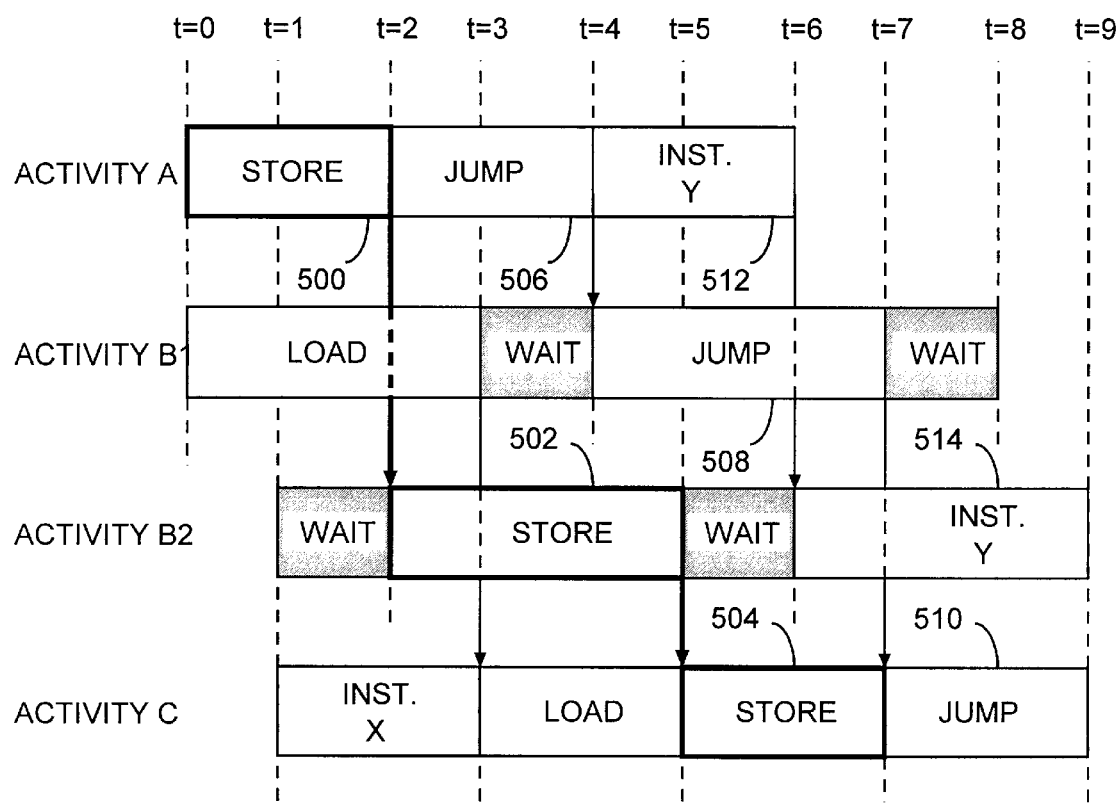
FIG. 14 is a timing diagram of the timing relationships of the stages of an emulated pipeline where activities are duplicated.

FIG. 14 is a timing diagram of the timing relationships of the stages of an emulated pipeline where activities are duplicated. Because the performance, or speed, of the emulated pipeline is limited by the slowest pipeline stage, it is beneficial to duplicate those activity routines that limit the emulation pipeline speed. This allows the other activity routines to alternate between the duplicated activities, each utilizing its own register and status flag. In the present example, the three program instructions illustrated in FIG. 13 are again shown as the STORE, LOAD, and JUMP instructions.

The STORE, JUMP and INST. Y of FIG. 13 were each followed by a wait state, shown as wait time blocks 450, 460 and 470 respectively. This is because the subsequent functions in activity B were not prepared to accept the information from activity A until the activity B functions were completed. Similarly, activity C completed its functions before activity B was prepared to transfer the information to the activity C functions. Therefore, the LOAD, STORE, and INST. Y instructions emulated at activity B defined the maximum time required at any pipeline stage.

In order to further increase the speed of the emulation pipeline, the limiting activity routine can be duplicated, as shown by activity B1 and activity B2 in FIG. 14. Activity A then alternates between activity B1 and activity B2 for the information transfer through the emulation pipeline. Similarly, activity C alternates between Activities B1 and B2 to receive the information. This in effect allows the wait states, shown as wait time blocks 456, 458, 462, 468, 472 and 478 in FIG. 13, to be bypassed, thereby decreasing the amount of time taken at each emulation pipeline stage.

More particularly, the program instruction information associated with the STORE, JUMP, and INST. Y program instructions in activity A are alternately transferred to activity B1 and activity B2. The STORE time block 500 between times t=0 and t=2 is transferred to the next pipeline stage shown as the STORE time block 502 at activity B2. The STORE time block 504 is the next stage in the emulation pipeline, which occurs between times t=5 and t=7. Therefore, the STORE instruction moves through the emulation pipeline from activity A, to activity B2, to activity C.

The program instruction information associated with the JUMP program instruction, shown at activity A at time block 506 between times t=2 and t=4, is transferred to the next pipeline stage shown as the JUMP time block 508 at activity B1. The JUMP time block 510 is the next stage in the emulation pipeline, which occurs between times t=7 and t=9. Therefore, the JUMP instruction moves through the emulation pipeline from activity A, to activity B1, to activity C.

The program instruction information associated with the INST. Y program instruction, shown at activity A at time block 512 between times t=4 and t=6, is transferred to the next pipeline stage shown as the INST. Y time block 514 at activity B2. From these examples it can be seen that the program instruction information associated with each of the program instructions emulated at the activity A stage alternates between interacting with activity B1 and activity B2. Activities B1 and B2 therefore cooperatively define activity B, and increase the emulation speed. It should be recognized that more than two activities could cooperatively define a particular activity without departing from the scope and spirit of the invention. For example, additional activities B3 and B4 (not illustrated) could also be used in connection with activities B1 and B2 to together define activity B.

Figure 15:
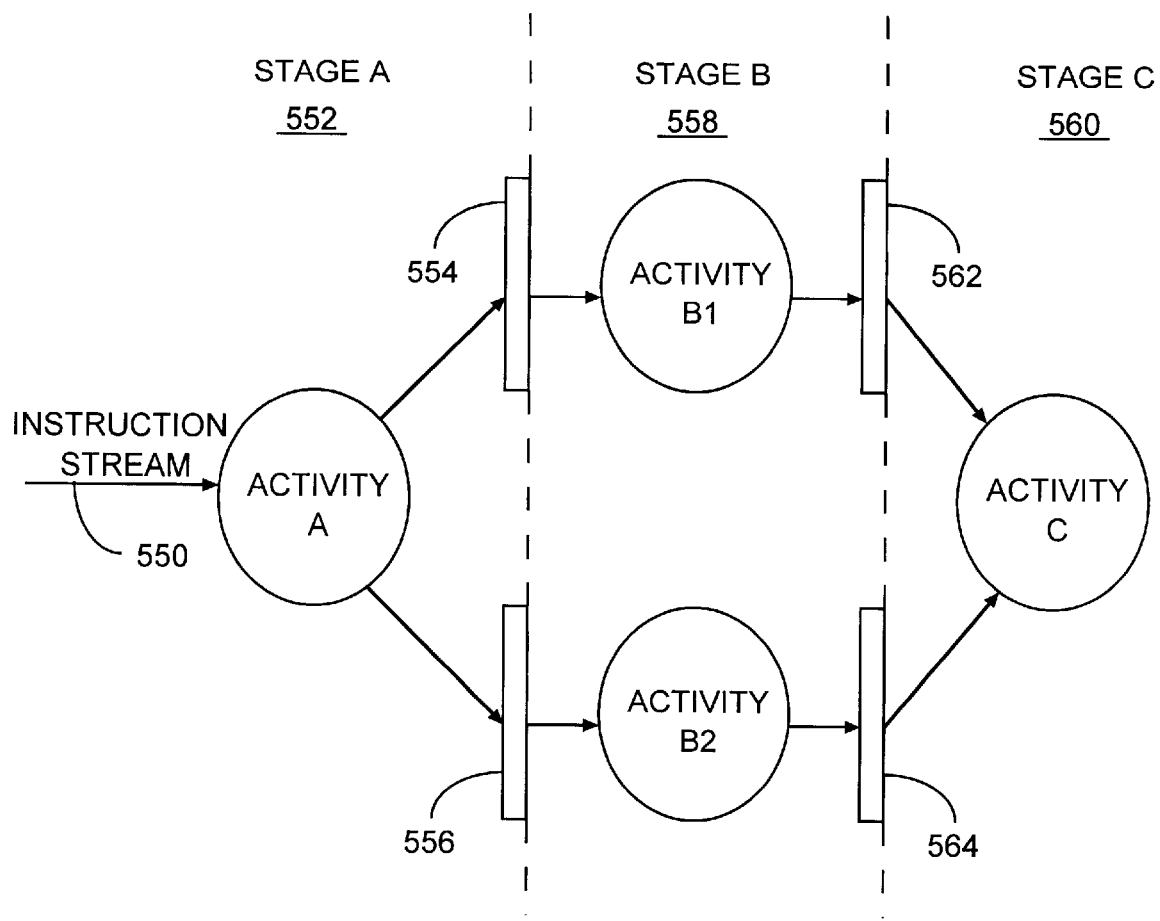
FIG. 15 is a diagram illustrating an example of an emulation pipeline in accordance with the present invention where the emulation pipeline includes three pipeline stages, and where one activity has been duplicated.

FIG. 15 is a diagram illustrating an example of an emulation pipeline having three pipeline stages, and where one activity has been duplicated as described in FIG. 14. The instruction stream enters the emulation pipeline via instruction bus 550, where it enters activity A at stage A 552. The information provided by activity A is then alternately provided to registers 554 and 556, where the information is alternately provided to activity B1 and activity B2 at stage B 558. The information from Activities B1 and B2 are alternately provided to activity C at stage C 560, by way of registers 562 and 564.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method of providing parallel, pipelined emulation of a plurality of program instructions, comprising the steps of:

sequentially providing a plurality of program instructions to a series of pipelined activity routines;

emulating one of a plurality of functions designated by each of the program instructions at each stage of the series of pipelined activity routines; and asynchronously forwarding information from each of the stages of the series of pipelined activity routines to their successive stages in the series, wherein each stage forwards its associated information to its respective successive stage when the stage has completed its function and has recognized that its respective successive stage has completed its respective function.

2. The method of claim 1, wherein the forwarding information step comprises the steps of:

storing the information forwarded from each stage into a corresponding one of a plurality of registers when the stage has completed its function; and receiving the information from the plurality of registers at particular ones of the respective successive stages when their corresponding functions have been completed.

3. The method of claim 2, further comprising the step of monitoring a status indicator to determine when each of the stages and their respective successive stages have completed their respective functions.

4. The method of claim 3, wherein the step of monitoring a status indicator comprises the step of monitoring the state of at least one status bit stored in each of the plurality of registers which are positioned between consecutive stages.

5. The method of claim 4, further comprising the step of setting the at least one status bit to a first value when the information from a sending stage of the consecutive stages is stored into the corresponding one of the plurality of registers, indicating that the information is ready to be accepted by a receiving stage of the consecutive stages.

6. The method of claim 5, wherein the step of forwarding information further comprises the step of receiving the information from the corresponding one of the plurality of registers when the receiving stage recognizes the value of the at least one status bit to be the first value.

7. The method of claim 5, further comprising the step of setting the at least one status bit to a second value when the information is received by the receiving stage from the corresponding one of the plurality of registers, indicating that new information may be entered into the corresponding one of the plurality of registers by the sending stage.

8. The method of claim 7, wherein the step of forwarding information further comprises the step of sending the information to the corresponding one of the plurality of registers when the sending stage recognizes the value of the at least one status bit to be the second value.

9. The method of claim 1, wherein the step of forwarding information comprises the step of buffering the information between each of the stages of the series of activity routines.

10. The method of claim 1, wherein the step of asynchronously forwarding the information comprises the steps of:

indicating when the information is available from sending stages; and indicating the availability to receive the information by successive receiving stages.

11. The method of claim 1, wherein the step of sequentially providing a plurality of program instructions to a series of activity routines comprises the step of independently processing each of the activity routines with separate processing units.

12. The method of claim 1, wherein the step of sequentially providing a plurality of program instructions to a series of activity routines comprises the step of processing each of the activity routines with a multi-tasking processing unit capable of concurrently processing each of the activity routines.

13. The method of claim 1, wherein the step of emulating further comprises the step of emulating a plurality of sub-functions, which aggregately define the function, at particular ones of the stages of the series of activity routines.

14. The method of claim 13, wherein the step of emulating a plurality of sub-functions comprises the step of providing at least one of the activity routines for each of the sub-functions, and concurrently processing each of the activity routines corresponding to the sub-functions.

15. The method of claim 14, wherein the step of concurrently processing each of the activity routines corresponding to the sub-functions comprises the step of processing each of the activity routines corresponding to the sub-functions with a different processing unit.

16. The method of claim 14, wherein the step of concurrently processing each of the activity routines comprises the step of processing each of the activity routines corresponding to the sub-functions with a multi-tasking processing unit capable of concurrently processing each of the activity routines corresponding to the sub-functions.

17. The method of claim 1, wherein the step of emulating comprises the step of concurrently emulating the functions designated by the program instructions at each of the stages.

18. An emulator for use in emulating computer functions specified by a plurality of program instructions, the emulator comprising:

a memory arrangement including a plurality of memory locations, wherein each of the memory locations includes a status indicator; and a pipelined processing arrangement including at least one processing unit to process a plurality of activity routines, the processing arrangement coupled to the memory arrangement to form stages of alternating activity routines and memory locations for concurrently providing isolated emulation functions at each stage, wherein the processing arrangement is configured and arranged to:

emulate one of the computer functions designated by the program instructions at each activity routine;

modify a state of the status indicators upon availability of the respective memory locations, wherein the modification of the status indicators is independent of any particular clock cycle;

asynchronously transfer the program instructions from the activity routines to their associated memory locations, when the corresponding status indicators indicate that the respective memory locations are available; and asynchronously transfer the program instructions from the memory locations to the activity routines of successive stages, when the corresponding status indicators indicate that the respective memory locations are holding available program instructions.

19. The emulator as in claim 18, wherein the processing arrangement comprises a plurality of processing units, each processing a different one of the activity routines.

20. The emulator as in claim 18, wherein the processing unit comprises a multi-tasking processing unit which concurrently processes each of the activity routines.

21. The emulator as in claim 18, wherein the processing arrangement comprises:

a plurality of processing units to process a first number of the activity routines; and a multi-tasking processing unit to concurrently process the remaining number of the activity routines.

22. The emulator as in claim 18, wherein the memory arrangement comprises a memory device having a plurality of contiguous memory locations.

23. The emulator as in claim 18, wherein the memory arrangement comprises a plurality of registers within the processing means.

24. The emulator as in claim 18, wherein the processing arrangement is further configured and arranged to emulate a plurality of sub-functions, which together produce one of the computer functions, by concurrently processing a plurality of the activity routines at a particular one of the stages.

25. The emulator as in claim 24, wherein the processing arrangement comprises a plurality of processing units, each processing a different one of the activity routines.

26. The emulator as in claim 24, wherein the processing arrangement comprises a multi-tasking processing unit which concurrently processes each of the activity routines.

27. The emulator as in claim 24, wherein the processing arrangement comprises:
   a plurality of processing units to process a first number of the activity routines; and
   a multi-tasking processing unit to concurrently process the remaining number of the activity routines.

28. A pipelined emulation system for emulating computer hardware under the control of a plurality of program instructions, wherein the program instructions are received by the emulation system, the emulation system comprising:
   a memory bank having a plurality of memory locations, wherein each of the memory locations includes at least one status bit;
   a plurality of processing units coupled to successively receive the program instructions, each having an input to receive information from a preceding one of the memory locations, and each further having an output to provide information to a succeeding one of the memory locations; and
   a plurality of computer-readable mediums corresponding to each of the plurality of processing units, each having computer program code embodied thereon, the computer program code including:
      first program code means for emulating one of a plurality of functions designated by each of the program instructions at each of the processing units;
      asserting the status bit at a particular memory location when execution of its corresponding function has completed:
      second program code means for forwarding information from each of the processing units to succeeding ones of the processing units when a given processing unit has completed its function and has recognized that the status bit for its succeeding processing unit has been asserted.

29. A method of providing parallel emulation of a plurality of program instructions, comprising the steps of:
   sequentially providing a plurality of program instructions to a series of activity routines;
   emulating one of a plurality of functions designated by each of the program instructions at each stage of the series of activity routines;
   forwarding information from each of the stages of the series of activity routines to their successive stages in the series, wherein each stage forwards its associated information to its respective successive stage when the stage has completed its function and has recognized that its respective successive stage has completed its respective function; and
   wherein forwarding information further comprises asynchronously passing the information through the stages of the series of activity routines.

30. The method of claim 29, wherein asynchronously passing the information through the stages comprises:
   providing first values in status indicators corresponding to the sending stages when the information is available from the sending stages;
   monitoring the status indicators at each of the corresponding receiving stages to determine when the information can be received;
   providing second values in the status indicators corresponding to the receiving stages when the receiving stages are available to receive the information; and
   monitoring the status indicators at each of the corresponding sending stages to determine when new information can be sent.

31. The method of claim 29, wherein sequentially providing a plurality of program instructions to a series of activity routines comprises:
   independently processing a first number of the activity routines with separate processing units; and processing a remaining number of the activity routines with a multi-tasking processing unit capable of concurrently processing the remaining number of the activity routines.

32. The method of claim 29, wherein:
   emulating further comprises emulating a plurality of sub-functions, which aggregately define the function, at particular ones of the stages of the series of activity routines;
   emulating a plurality of sub-functions comprises providing at least one of the activity routines for each of the sub-functions, and concurrently processing each of the activity routines corresponding to the sub-functions; and
   concurrently processing each of the activity routines comprises:
      (i) processing a first number of the activity routines corresponding to the sub-functions with a different processing unit; and
      (ii) processing a remaining number of the activity routines corresponding to the sub-functions with a multi-tasking processing unit capable of concurrently processing each of the activity routines corresponding to the sub-functions.

33. The method of claim 29, further comprising duplicating a particular one of the activity routines, and wherein sequentially providing a plurality of program instructions further comprises alternately providing the program instructions to the particular ones of the activity routines which are duplicated.

34. An emulator for use in emulating computer functions specified by a plurality of program instructions, the emulator comprising:
   a memory arrangement including a plurality of memory locations, wherein each of the memory locations includes a status indicator;
   a processing arrangement including a first processing unit to process a plurality of activity routines, the processing arrangement coupled to the memory arrangement to form stages of alternating activity routines and memory locations for concurrently providing isolated emulation functions at each stage, wherein the processing arrangement is configured and arranged to:
      emulate one of the computer functions designated by the program instructions at each activity routine;

transfer the program instructions from the activity routines to their associated memory locations, when the corresponding status indicators indicate that the respective memory locations are available; and transfer the program instructions from the memory locations to the activity routines of successive stages, when the corresponding status indicators indicate that the respective memory locations are holding available program instructions; and wherein the processing arrangement further comprises a duplicative processing unit configured and arranged to duplicate one of the activity routines in a corresponding stage, and wherein resulting duplicate activity routines concurrently process alternate ones of the program instructions.

* * * * *